United States Patent

[11] 3,625,952

[72] Inventor Carl-Wolfgang Schellhammer
     Opladen, Germany
[21] Appl. No. 697,605
[22] Filed Jan. 15, 1968
[45] Patented Dec. 7, 1971
[73] Assignee Farienfabriken Bayer Aktiengesellschaft
     Leverkusen, Germany
[32] Priority Jan. 20, 1967
[33] Germany
[31] F 51 305

[54] 7-TRIAZOLYL-3-PHENYL-COUMARINS
     5 Claims, No Drawings
[52] U.S. Cl. .................................................. 260/308 R,
                                    252/301.2 W, 260/343.2 R
[51] Int. Cl. ................................................... C07d 99/04
[50] Field of Search ........................................... 260/308

[56] References Cited
     UNITED STATES PATENTS

| | | | |
|---|---|---|---|
| 3,251,851 | 5/1966 | Schellhammer et al. | 260/308 |
| 3,271,412 | 9/1966 | Raue et al. | 260/308 |
| 3,288,801 | 11/1966 | Fleck et al. | 260/308 |

Primary Examiner—Alton D. Rollins
Attorney—Plumley, Tyner & Sandt

ABSTRACT: Fluorescent compounds adapted for use as optical brightening agents in fibers, foils, filaments, fabrics, and plastics are provided as follows:
7-[1,2,4-triazolyl-(1)]-3-phenyl-coumarin compounds of the general formula

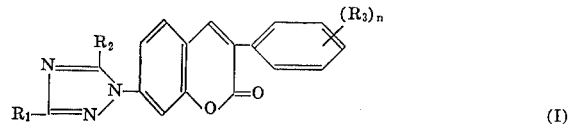

(I)

in which $R_1$ and $R_2$, independently of one another, stand for hydrogen for an alkyl raidcal with one to four carbon atoms, for an aralkyl radical, or for an optionally substituted aryl radical, and $R_3$ denotes hydrogen, an alkyl radical containing one to four carbon atoms, an alkyoxy radical containing one to four carbon atoms or halogen, and n stands for the numbers one to three
or quaternisation products thereof having the formula

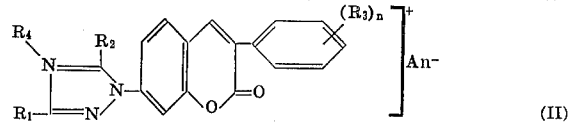

(II)

wherein $R_1$, $R_3$, $R_2$ and n have the meanings given above, $R_4$ stands for an alkyl radical with one to four carbon atoms or an aralkyl radical and $An^-$ denotes a colorless anion.

7-TRIAZOLYL-3-PHENYL-COUMARINS

The object of the present invention comprises 7-[1,2,4-triazolyl-(1)]-3-phenyl-coumarin compounds of the general formula

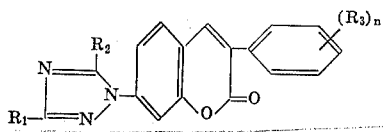

wherein $R_1$ and $R_2$, independently of one another, stand for hydrogen, for an alkyl radical with one to four carbon atoms, for an aralkyl radical, or for an optionally substituted aryl radical, and $R_3$ denotes hydrogen, an alkyl radical containing one to four carbon atoms, an alkoxy radical containing one to four carbon atoms or halogen, e.g., chlorine, and $n$ denotes the numbers 1-3, or quaternization products thereof having the formula

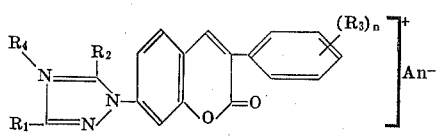

wherein $R_1$, $R_2$, $R_3$ and $n$ have the meanings given above, $R_4$ stands for an alkyl radical with one to four carbon atoms or an aralkyl radical, preferably an optionally substituted benzyl group and $An^-$ denotes a colorless anion which derives from the quaternization agent or is introduced by a subsequent exchange reaction.

Suitable alkyl groups are for example methyl, ethyl and butyl groups.

Suitable aralk groups are especially benzyl groups which may have substituents such as alkyl groups with one to four carbon atoms alkoxy groups with one to four carbon atoms or halogen atoms such as Cl and Br. Examples for such groups are benzyl, methylbenzyl, ethylbenzyl, butylbenzyl, methoxybenzyl, butoxybenzyl, chlorobenzyl and bromobenzyl groups.

Suitable aryl groups are especially optionally substituted phenyl groups having substituents such as alkyl groups with one to four carbon atoms, alkoxy groups with one to four carbon atoms, halogen atoms such as Cl or Br. Examples are phenyl, chlorophenyl, bromophenyl, dichlorophenyl, methylphenyl, ethylphenyl, methoxyphenyl, ethoxyphenyl and butoxyphenyl groups.

Suitable anions are $Cl^-$, $Br^-$, sulfonate groups such as $CH_3OSO_3^-$, $C_2H_5OSO_3^-$, p-toluenesulfonate, benzenesulfonate, $BF_4^-$, phosphate, acetate, perchlorate, sulfate and oxalate groups.

The quaternization products of formula (II) are obtained in usual manner by quaternization of compounds (I). Suitable quaternization agents are for example the esters of strong mineralic acids or the lower alkyl esters of organic sulfonic acids such as alkyl chlorides, alkylbromides, aralkyl- halogenides, dialkylsulfates and esters of sulfonic acids of the benzene series such as the methyl, ethyl, propyl and n-butylesters of benzenesulfonic acid, p-methylbenzene sulfonic acid. The reaction of the coumarine compounds (I) with the quaternization agents is preferably carried out in inert organic solvents at elevated temperatures. The precipitated salts may conveniently be isolated from the reaction mixture by filtration. Suitable organic solvents are for example high boiling aliphatic cycloaliphatic or aromatic hydrocarbons, stable aliphatic and cyclic halogen compounds such as $CCl_4$, tetrachloroethylene, chlorobenzene, dichlorobenzene and nitrobenzene. In many cases the quaternization agent may be used as solvent.

The compounds (I) and (II) are fluorescent and may be used as optical brightening agent.

The brightening agents of the present invention are suitable for the brightening of materials of the greatest diversity, primarily for the brightening of fibers, filaments, woven and knitted fabrics, foils or plastic compositions of synthetic origin, e.g., for the brightening of materials of cellulose esters, polyamides, polyurethanes, polyacrylonitrile and polyesters. The quaternization products are especially suitable for brightening materials of polyacrylonitrile.

Preferred compounds (II) are those wherein $R_1$, $R_2$ and $R_4$ denotes an alkyl group with one to four carbon atoms, $R_3$ denotes an alkoxy group with one to four carbon atoms, $n$ stands for the number 1 and $An^-$ has the meaning given above.

The coumarin compounds of the above formula can be obtained by various methods, for example, by diazotizing 7-amino-3-phenyl-coumarins, reducing the diazonium salts and subsequently reacting the resultant 7-hydrazino-3-phenyl-coumarins with formamide or diacylamides. The quaternization products can be obtained from the coumarin compounds of the above formula by the reaction with quaternizing agents, such as dimethyl sulfate.

The brightening agents of the present invention can be used in usual manner, for example, in the form of solutions in water or organic solvents, or in the form of aqueous dispersions. Polyester materials can also be treated with the brightening agents by impregnating them with solutions or dispersions of the brightening agents, then squeezing, drying and briefly heating them to temperatures above 150° C. It is also possible to add the brightening agents to casting and spinning solutions which serve for the production of synthetic fibers, filaments, foils and other shaped articles.

The brightening agents according to the invention are stable towards chlorite-containing bleaching baths, and the brightening effects obtained are outstandingly fast to light.

EXAMPLE 1

Polyacrylonitrile fibers are introduced, at a goods-to-liquor ratio 1:40, into a bath which contains, per litre, 1 g. oxalic acid, 1 g. sodium chlorite as well as 0.1 g. of the compound of the formula

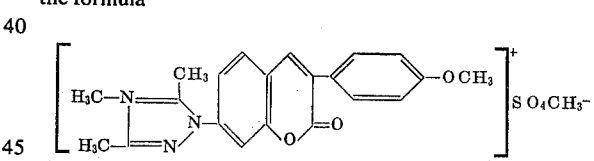

as brightening agent. The bath is heated to boiling temperature within 20 minutes and kept at this temperature for 45–60 minutes. The polyacrylonitrile fibers are subsequently rinsed and dried. The fibers are then brightened in an outstanding manner.

The brightening agent used was prepared as follows:

A hot solution of 106 g. 7-amino-3-p-methoxyphenyl-coumarin in 750 cc. glacial acetic acid was mixed, while hot, with 160 cc. concentrated hydrochloric acid, then cooled to +10° C., slowly mixed with a solution of 30 g. sodium nitrite in 80 cc. water and stirred at +10° C. for a further 15 hours. The diazonium salt suspension formed was added at 0° C., while stirring, to a solution of 184 g. tin II-chloride in 400 cc. concentrated hydrochloric acid, the reaction mixture was stirred for a further 2 hours, and then poured, while stirring, into 6 litres of hot water. The precipitated reaction product was filtered off with suction and suspended in 3 litres of cold water. After the suspension had been adjusted with ammonia to a pH value of about 10, the precipitated product was again filtered off with suction and then dried at 100° C.

112 g. of the resultant 7-hydrazino-3-p-methoxyphenyl-coumarin of melting point 180° C., 48 g. diacetamide, 56 g. pyridine hydrochloride and 500 cc. pyridine were heated for 4 hours, while stirring and under reflux cooling. After cooling, the precipitated product was filtered off with suction and washed with methanol. 77 g. of the resultant 7-[3,5-dimethyl-1,2,4-triazolyl-(1)]-3-p-methoxy-phenyl-coumarin of melting point 215°–216° C. were dissolved in 1 litre hot chlorobenzene, the solution was mixed at 130° C. with 35 g. dimethyl sulfate and the temperature kept at this temperature for a further 4 hours. The precipitated crystals were filtered off with suction and washed with a little methanol. The 7-[3,4,5-trimethyl-1,2,4-triazol-(1)-ium]-3-p-methoxyphenyl-coumarin-methosulfate obtained with a yield of 7.5 g. exhibited, after redissolution from water, methanol or glycol monomethyl ether acetate/water, a melting point of 205° C. with decomposition.

Good brightening effects on polyacrylonitrile fibers are also obtained when, instead of the aforementioned compound, one of the compounds set out in the following table and having the following formula is used.

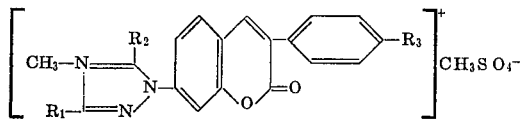

| Brightening agent | $R_1$ | $R_2$ | $R_3$ | melting point as °C. |
|---|---|---|---|---|
| (a) | H | H | H | 252°–253° |
| (b) | H | H | $CH_3$ | 257° |
| (c) | H | H | $O—CH_3$ | 254° |
| (d) | H | H | $OC_2H_5$ | 236°–237° |
| (e) | H | H | $O—C_3H_7(n)$ | 227°–229° |
| (f) | H | H | $O—C_4H_9(n)$ | 236°–238° |
| (g) | $CH_3$ | $CH_3$ | $CH_3$ | 214° |

The brightening agents indicated under (a)–(f) were prepared in such a manner that the appropriate 7-hydrazino-3-phenyl-coumarins were heated at 160°–180° C. for 3–6 hours with formamide and subsequently quaternized with dimethyl sulfate; the brightening agent indicated under (g) was prepared in such a manner that 7-hydrazino-3-p-tolyl-coumarin was heated in pyridine/pyridine hydrochloride at 110° C. for 4 hours with diacetamide and subsequently reacted with dimethyl sulfate.

EXAMPLE 2

Polyester fibers produced from terephthalic acid and glycol and introduced, at a goods-to-liquor ratio 1:40, into a bath which contains, per litre, 1 g. oleyl sulfonate, 0.75 g. formic acid and 0.07 g. of one of the brightening agents set out in the table below. The bath is subsequently heated to boiling temperature and kept at this temperature for 30–60 minutes. After rinsing and drying, the polyester fibers show a very good brightening effect.

The following compounds are used for the brightening agents concerned;

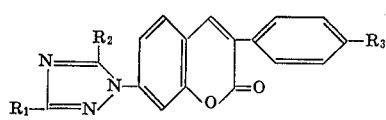

| Brightening agent | $R_1$ | $R_2$ | $R_3$ | melting points as °C. |
|---|---|---|---|---|
| (a) | H | H | H | 229°–231° |
| (b) | H | H | $CH_3$ | 218°–220° |
| (c) | H | H | $O—CH_3$ | 250° |
| (d) | H | H | $O—C_2H_5$ | 206° |
| (e) | H | H | $O—C_3H_7(n)$ | 205° |
| (f) | H | H | $O—C_4H_9(n)$ | 195°–198° |
| (g) | H | $C_6H_5$ | $CH_3$ | 203°–204° |
| (h) | H | $C_6H_5$ | $O—CH_3$ | 209°–213° |
| (i) | $CH_3$ | $CH_3$ | | 237° |
| (k) | $CH_3$ | $CH_3$ | $O—CH_3$ | 215°–216° |

The brightening agents listed under (a)–(f) were prepared by heating the corresponding 7-hydrazino-3-phenyl-coumarins with formamide at 160°–180° C. for 3–6 hours. The brightening agents listed under (g) and (h) were prepared by heating the corresponding 7-hydrazino-3-phenyl-coumarins with N-formyl-benzamide in pyridine/pyridine hydrochloride at 110° C. for 4 hours, whereas the brightening agents listed under (i) and (k) were obtained in an analogous manner with the use of diacetamide, instead of N-formyl-benzamide.

EXAMPLE 5

A fabric of cellulose triacetate fibers is introduced, at a goods-to-liquor ratio 1:40, into a bath which contains, per litre, 1 g. oleyl sulfonate 0.75 g. formic acid and 0.07 g. of one of the brightening agents mentioned in example 2. The bath is then heated to 60° C. within 20 minutes and kept at this temperature for 30–60 minutes. After rinsing and drying, the fabric shows a brilliant brightening effect.

EXAMPLE 4

One of the brightening agents mentioned in example 1 is added to a conventional polyacrylonitrile spinning solution in such an amount that the concentration of the brightening agent in the spun polyacrylonitrile fiber material amounts to 0.1 percent by weight. The spinning solution is spun in usual manner and the resultant fiber material is moved about for a further 45 minutes, at a goods-to-liquor ratio 1:40, in an aqueous bath at 95° C. which contains, per litre, 1 g. sodium chlorite as well as 1 g. oxalic acid. The fibers obtained are then pure white.

We claim:
1. 7-[1,2,4-triazolyl-(1)]-3-phenyl-coumarin compounds of the general formula

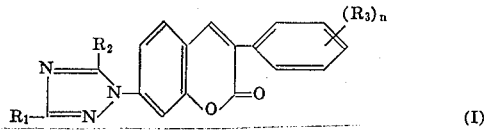

in which $R_1$ and $R_2$, independently of one another, stand for hydrogen, for an alkyl radical with one to four carbon atoms, or for a phenyl radical, and $R_3$ denotes hydrogen, an alkyl radical containing one to four carbon atoms, an alkoxy radical containing one to four carbon atoms or halogen, and $n$ stands for the numbers 1–3 or quaternization products thereof having the formula

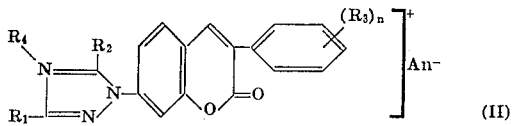

where $R_1$, $R_3$, $R_2$ and $n$ have the meanings given above, $R_4$ stands for an alkyl radical with one to four carbon atoms and $An^-$ denotes a colorless anion.

2. 7-[1,2,4-triazolyl-(1)]-3-phenyl-coumarin compounds of the formula

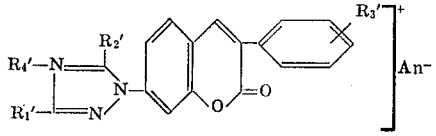

wherein $R_1'$, $R_2'$ and $R_4'$ stand for an alkyl residue with one to four carbon atoms, $R_3'$ stands for an alkoxy residue with one to four carbon atoms and $An^-$ denotes a colorless anion.

3. The compound of the formula

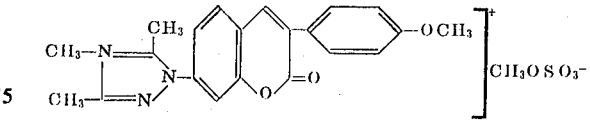

4. The compound of the formula
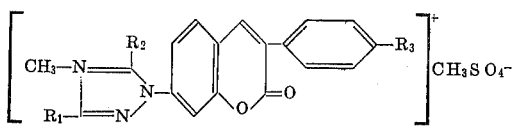
wherein $R_1$ is H or $CH_3$,
$R_2$ is H or $CH_3$, and
$R_3$ is H, $CH_3$, $OCH_3$, $OC_2H_5$, $OC_3H_7(n)$ or $O-C_4H_9(n)$.
5. A compound of the formula
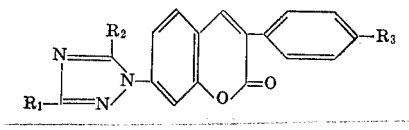
wherein $R_1$ is H or $CH_3$,
$R_2$ is H, $CH_3$ or $C_6H_5$, and
$R_3$ is H, $CH_3$, $OCH_3$, $OC_2H_5$, $OC_3H_7(n)$ or $O-C_4H_9($
* * * * *